United States Patent [19]
Appel et al.

[11] Patent Number: 5,345,549
[45] Date of Patent: Sep. 6, 1994

[54] MULTIMEDIA BASED SECURITY SYSTEMS

[75] Inventors: Arthur Appel, Yorktown Heights; Michael A. O'Connor, Mahopac, both of N.Y.

[73] Assignee: International Business Machines Corporation, Armonk, N.Y.

[21] Appl. No.: 968,769

[22] Filed: Oct. 30, 1992

[51] Int. Cl.5 .............................................. G06F 15/20
[52] U.S. Cl. .................................. 395/154; 395/161; 380/4; 380/23
[58] Field of Search ............... 395/153, 154, 155, 161; 380/23, 24, 25, 3, 4, 5; 235/382, 382.5; 902/5; 340/825.31, 825.34

[56] References Cited

U.S. PATENT DOCUMENTS

| | | | |
|---|---|---|---|
| 3,984,923 | 10/1976 | Rawson et al. | 434/316 |
| 4,529,870 | 7/1985 | Chaum | 380/25 |
| 4,578,567 | 3/1986 | Granzow et al. | 235/380 |
| 4,932,056 | 6/1990 | Shamir | 380/25 |
| 4,964,163 | 10/1990 | Berry | 380/25 |
| 5,056,141 | 10/1991 | Dyke | 380/25 |
| 5,163,097 | 11/1992 | Pegg | 380/24 |
| 5,163,098 | 11/1992 | Dahbura | 380/24 |
| 5,185,515 | 2/1993 | Nishibe | 235/382 |
| 5,193,114 | 3/1993 | Moseley | 380/23 |
| 5,208,745 | 5/1993 | Quentin et al. | 395/154 |
| 5,219,291 | 6/1993 | Fong et al. | 434/323 |

OTHER PUBLICATIONS

Carter et al., "An Integrated Biometric Database", IEE Colloquium on Electronic Images and Image Processing in Security and Forensic Sciences, IEE (1990), pp. 8/1–8/6.

Primary Examiner—Heather R. Herndon
Assistant Examiner—N. Kenneth Burraston
Attorney, Agent, or Firm—Thomas P. Dowd; Richard M. Ludwin

[57] ABSTRACT

A computer-utilizing security system and method involving a collection of personally selected strong-reaction sensory and/or historical multimedia-type cues in combination with a related set of structured information. The cue combination is submitted by one or more individuals to be authorized to access a secure environment, so that when a multimedia cue along with a set of queries contained in and regarding the related information are presented for gaining entry to the secured environment, an authorized individual may readily respond to the queries with correct reactions based on strong personal recall.

9 Claims, 4 Drawing Sheets

MULTIMEDIA BASED SECURITY SYSTEMS

BACKGROUND OF THE INVENTION

1. Field of the Invention

The present invention relates to computer-utilizing security systems and more particularly to a system and method for facilitating the use of identification and verification devices in obtaining access to secured environments by authorized users.

2. Prior Art

Security systems using locking devices operable by means of some form of computer input have become commonplace. Many of these computer-utilizing systems, including application programs, computer discs containing sensitive information, automated teller machines, door access systems, banking, credit and information systems, and the like, maintain security by permitting access only after invocation of an identification word and password pair composed of fixed sequences of user chosen or assigned alphanumeric characters. The interaction of invocation and user response is typically achieved by signals produced electronically, optically, piezoelectrically, etc..

THE PROBLEM TO BE SOLVED

Validity rules for these word pair systems strive to ensure that easily determined combinations are disallowed. Since by design the word pairs are not easily determined, infrequently used word pairs can be difficult to recall. Even frequently used word pairs can be lost to memory as the number and complexity of these combinations increases from a manageable 2 or 3 to the 10 or more word pairs for the workplace and another 10-15 for phone mail, credit cars, bank cards, accounting systems, etc., that a typical computer user can easily require. The recall problem is exacerbated by security measures that require that word pairs be periodically changed. When a word pair is forgotten the user is merely inconvenienced at best, but sometimes valuable information or time is lost, or needed money is rendered inaccessible. The lost password scenario can lead to user fear and frustration, and to avoid these problems users commonly resort to trying to find easily remembered and hence easily determined combinations or to making copies of the word pairs in writing or in some computer file. These approaches severely degrade the security of the systems by making the word pair easier to obtain on the part of an intruder and making repeated penetration possible once the word pair has been obtained.

A persistent and potentially serious problem is thus presented by the need for a person to recall various "passwords" or a number of specific combinations in order to gain access to the secure environments that the person is legitimately authorized to access.

The present invention is directed to solving such problems by providing a user friendly, personalized secure alternative to existing "password" systems.

It is accordingly an object of the present invention to provide a system and method for computer-utilizing security systems which facilitates the obtaining of access to a secured environment by an authorized user.

It is another object of the present invention to provide a system and method using interactive querying of cue refreshed personal knowledge from an individual data base to augment or replace word pairs as the identity verification component of computer-based security systems.

It is a further object of the present invention to provide a system and method utilizing a collection of personally selected strong-reaction multimedia-type cues along with a related set of structured information, submitted by one or more individuals to be authorized to access a secure environment, so that when the cues, a multimedia-type representation with an accompanying set of related information queries, are presented for gaining entry to the secured environment, an authorized individual may readily respond to the queries with a correct reaction based on strong personal recall of the related structured information.

SUMMARY OF THE INVENTION

The present invention provides a system and method for facilitating the use of computer-utilizing security systems by a procedure rendering "passwords", i.e., identification and verification input signals for obtaining access to secured environments, readily recallable by authorized users. The invention employs multimedia-type representations, e.g., images, sounds, smells, multisensory stimulants, etc., with interactive querying to cue a user to react with refreshed peculiar personal information, corresponding to that in a prepared data base, to augment or replace presently used word pairs as the identity verification component of computerized security systems.

More particularly, a typical system in accordance with the present invention, may generally consist of:

1. A multimedia-type I/O device that can capture and that can present, by display and/or other simulation, multimedia or multisensory data;
2. A storage device for storing representations of multimedia data, such as one or more pictures, mixed images, video, sounds, music, documents, personal histories, smells, and/or other multisensory data captured by the I/O device, and for quickly recalling such representations of multimedia data for presentation as multimedia cues on such devices;
3. A structured data base for associating peculiar information or details with the multimedia cues to form cue sets stored in the storage device, and for organizing the creation of and access to collections of cue sets associated with individuals with a right to access; and
4. A control device that, when a user seeking access to a secure system by identifying himself in some manner as an individual with the right to access, such as in a public way by name, userid, etc., causes the multimedia cue or cues of the cue sets in the database associated with that individual to be presented in a predetermined order along with a related set of queries to elicit responses in keeping with the peculiar details associated with each cue, and which evaluates the correctness of the responses, and controls access to the secure system based on the correctness of the responses; and/or
5. An additional device that augments or replaces the preceding control device by substituting random selection of the cue sets in the collection of cue sets for the predetermined order presentation, and/or by substituting random selection of queries from the related set of queries for the predetermined order presentation of the queries set.

Each user, i.e., person desiring access to a secure system, may individually initialize the structured multimedia data base by providing a collection of personally selected strong-reaction sensory and/or historical cues along with a set of structured cue-related information. Then, when one or more multimedia cues and the sets of related queries are presented for gaining entry to the secured environment, the user may readily respond with the correct reaction based on strong personal recall stimulated and guided by the cues and queries presented.

DETAILED DESCRIPTION OF THE INVENTION

There are many facts from an individual's life easily recalled even after extended periods of time, especially when the memory is refreshed by strongly familiar visual, auditory, or other sensory or historical cues. Since the life and memories of an individual are unique and specific, the cues are quite personal, that is, a photograph of an individual's family elicits responses from that individual that will not occur with someone else. One person easily associates specific names with specific faces, such as those of family or close friends, which association is not possible for a stranger. A few bars of a favorite song can effortlessly bring to mind the time and place and circumstances when the music was first heard, while evoking little, if anything, or a completely different association from another. Vivid memories of the score, of the players, of the weather will arise to the participants of a meaningless championship intramural game, years afterwards, at the mere mention of the game, but only to those participants. Cues of this types can easily be stored and displayed by computer systems and even by current personal computer systems. Further, data base systems exist that can be used to organize and provide access to such cues and user supplied information about the cues. If a personal cue is presented to an individual, then that individual can respond readily and easily, and often pleasurably, to queries based on the stored information related to the cue. In fact, since the memories of an individual are so unique and specific, a correct response to sufficiently many such queries can suffice to verify a user's identity as well as, if not better than, the word pairs now commonly used. The present invention involves using such interactive querying of cue refreshed personal knowledge from an individual data base to augment or replace word pairs as the identity verification component of computer-utilizing security systems.

Figure 1:
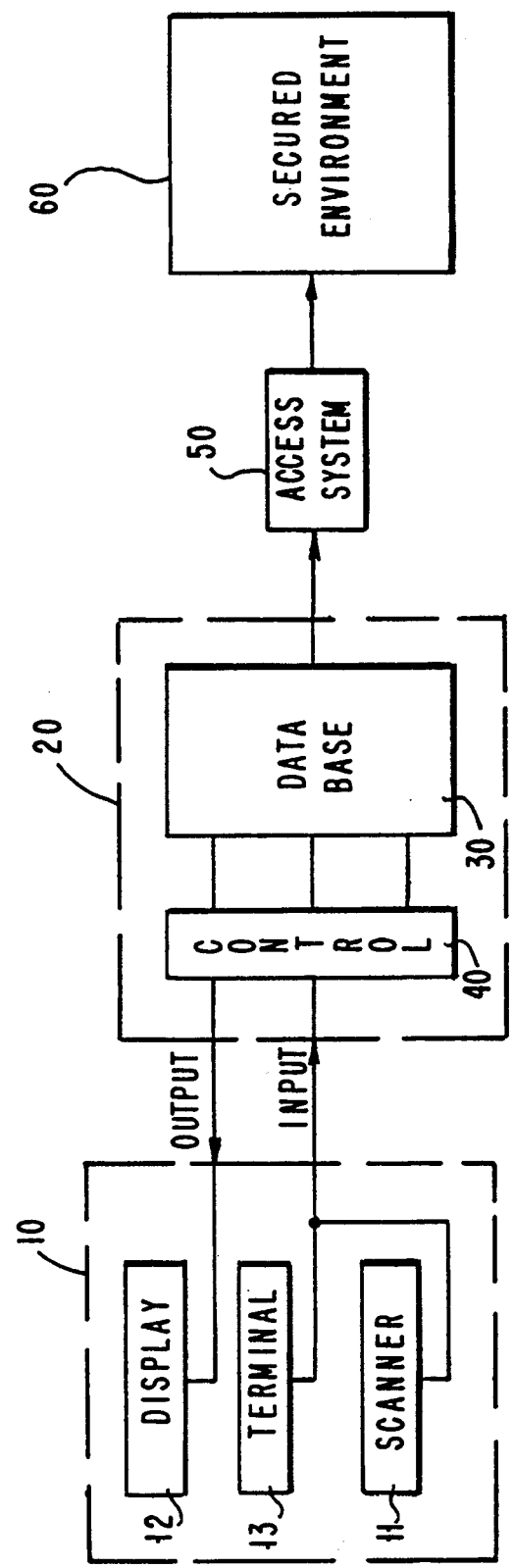
FIG. 1 is a block diagram of a security system in accordance with the present invention.

A preferred system in accordance with the present invention, as shown in FIG. 1, may generally be constructed of a multimedia-type I/O device 10, a storage device 20 for storing multimedia or multisensory data captured by the I/O device, a structured data base 30 for associating peculiar information or details with the multisensory data as multimedia cue sets and stored in the storage device 20, and a control system 40 that causes the cues of each of the cue sets in the database to be presented by the I/O device to a user seeking access to a secure environment 60 through an access system 50.

For the purpose of a particular description the I/O device 10 may be an automatic teller machine (ATM) and the storage device 20 a general purpose computer, such as an IBM PS/2. The structured data base 30 and the control system 40 may be in the form of software such as an application program running on and configuring the computer. In this environment, when a bank customer makes application for an account and wishes to gain access to it for transactions by means of the ATM, personal items may be selected for entry into the data base. For example, items that can be represented by images, such as of photographs or text documents, or combinations thereof, containing family gatherings, personal histories, and such, are captured by an I/O portion 11, of the ATM, e.g., by means of a scanner, and the representations thereof are stored in the data base in computer storage available to be quickly recalled for presentation as multimedia cues on the I/O device, e.g., by means of a display 12. I/O devices which capture and reproduce sounds, such as music or a combination of tones, and/or other multisensory data, such as even smells, that will stimulate peculiar personal reactions, may also be employed for this purpose. In addition to the input of the multisensory data, related information, involving cue associated data and queries, is entered for inclusion in the structured data base 30 which associates peculiar details and facts in the related information with the multimedia cues to form cue sets stored in the storage device 20. The data base organizes the creation of and access to collections of such cue sets which are associated with one or more individuals who are to be granted the right to access the secured environment of the ATM. The cue sets essentially contain three items, 1) multimedia representations or cues, 2) cue associated data or information, which is peculiarly within the knowledge of the authorized individual or individuals and of such a nature as to inspire quick recall and reaction on their part when the representations or cues are presented in some manner to their senses, and 3) sets of queries related to the cues and associated information to elicit a reaction on the part of an individual to correctly identify the particular information associated with a cue by virtue of peculiar knowledge of their relationship.

After the data base 30 with the cue sets has been created, the control system 40 may be operated when a person desires to gain entry to his account through the ATM for a transaction. If there is more than one user, the person will use an input terminal 13 to initially identify himself or herself in a public way (by name, userid, keycard, etc.) as an individual with the right to access. In response to identifying signals from the terminal 13, the control system 40 is prompted to produce signals which cause the multimedia cues of the cue sets associated with that individual in the database 30, to be presented in a predetermined order along with the queries to elicit responses. The queries are arranged to elicit responses in keeping with the peculiar details of the stored personal information associated with the multimedia cue presented, in a predetermined order, when each cue is presented on an output, such as display 12 of the ATM. The individual responds to each query related to a cue by entering some form of input, such as on a keyboard or touch terminal, that may be part of terminal 13 disposed in the I/O device 10. The inputs to a series of queries about a particular cue result in signals intended to indicate the correct set of peculiar information in the data base associated with the respective cue, that is, the personally selected associated information in the cue set. The control system 40 evaluates the correctness of a response or the series of responses, by comparison with the stored cue set information, and controls access to the secured environment 60, i.e., the banking transaction system, based on the correctness of the responses. Entrance or access to the secured environment may be implemented by the actuation or unlocking of an appropriate access system 50 through an appropriate signal from the control system 40 when a preset level of correct responses occurs.

If desired, the preceding control system may additionally be modified with a capability that augments or replaces the preceding predetermined order mode of control by substituting random selection of the cue sets to be presented for each access sought, and/or by substituting random selection of cues and of queries for details associated with cues for the predetermined order of the queries. This randomization of the cues would make it more difficult for someone without authorization, who is seeking access to a system by imitating the predetermined reaction pattern, or by systemized guessing, to achieve entry.

Figure 2:
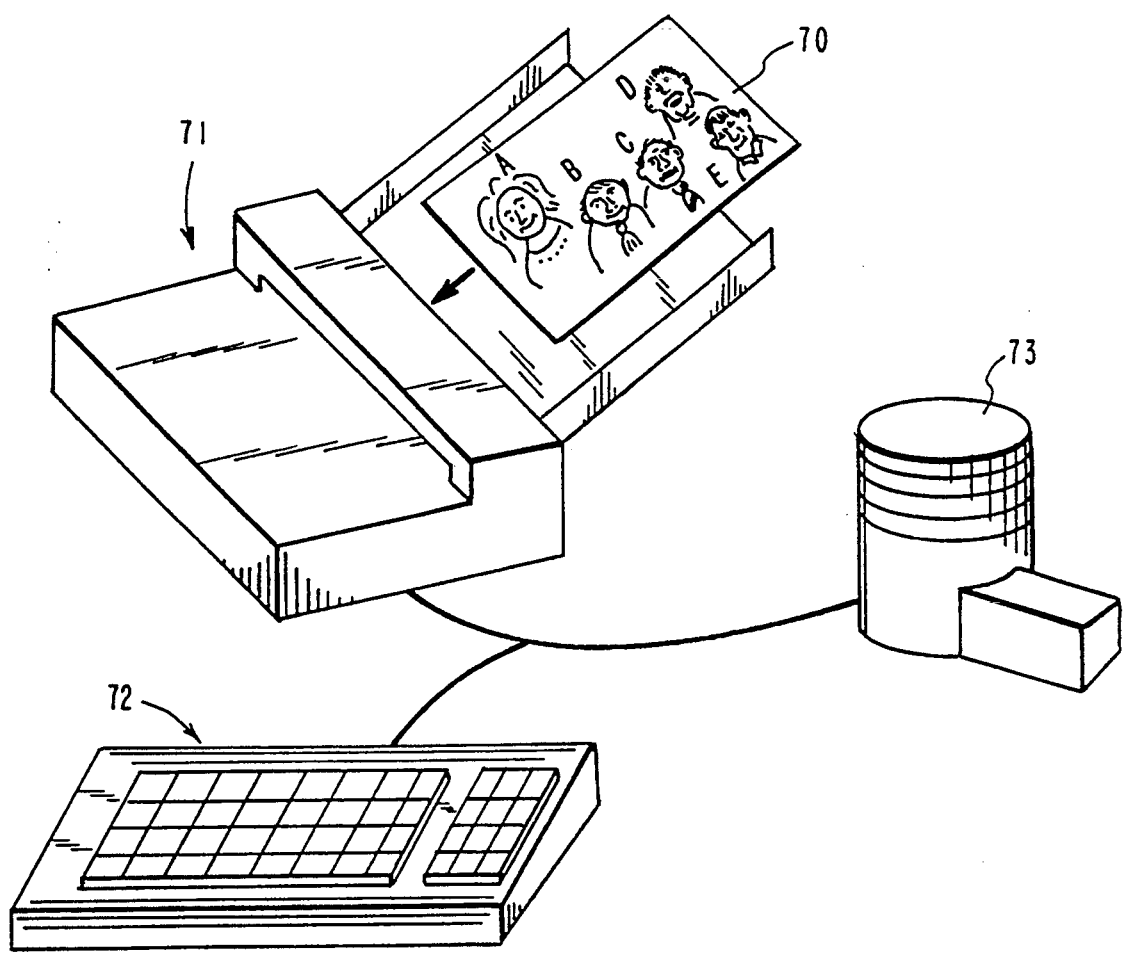
FIG. 2 illustrates a multimedia cue item in the form of a family picture that may be provided by a user for input with an I/O Device scanner to tile disk stored Data Base of FIG. 1, together with related information, such as the names, birth dates, familial relationships, significant events, favorite foods, hobbies, or other relevant details, peculiar to each of the family members depicted and readily familiar to the user, input with an I/O Device keyboard.

Thus, each user, i.e., individual seeking authorized access to a secure environment protected by a system in accordance with the invention, may individually initialize the multimedia data base by providing data in the form of a collection of personal sensory and/or historical cues and a detailed set of structured associated information. For example, a family picture 70 including 5 faces, labeled A to E as shown in FIG. 2, could be provided by the user for input to a data base together with the names, birth dates, familial relationships, significant events, favorite foods, hobbies, or other relevant information peculiar to each of the family members depicted and readily familiar to the individual user. The I/O device for this purpose may typically consist of a scanner 71 for the photo data and a keyboard 72 for the related information data, both of which produce signals representative of the respective data being stored in a storage device such as disk storage 73.

Two modes may be used to enable the data to be appropriately entered. First, for commonly occurring types of cue items, a predetermined and precoded set of information can be requested. For example, if a family picture is one of the common types, the following interactive dialogue may be used to generate a cue set.

q: low many labeled individuals appear in photo?
a: 5
q: Identifying them from left to right as A, B, C, etc., what is A's first name?
a: Mary
q: What is A's birth date?
a: Jul. 7, 1961
q: What is A's familial relation to you?
a: Cousin
q: What is A's favorite food?
a: yogurt
q: What is B's first name?
a: John
q: What is B's birth date?
a: Mar. 8, 1975

In the second mode, a freer form format can be allowed for cue types which are not common enough to warrant special coding. For example, if a family picture is not one of the common types, an equivalent cue set could be created for such a picture by the more general interactive dialogue as follows.

q: Give question:
a: What is A's first name?
q: Give answer:
a: Mary
q: Give question:
a: What is A's birth date?
q: Give answer:
a: Jul. 7, 1961
q: Give question:
a: What is A's familial relation to you?
q: Give answer:
a: Cousin
q: Give question:
a: What is B's first name?
q: Give answer:
a: John
q: Give question:
a: What is B's birth date?
q: Give answer:
a: Mar. 8, 1975

Figure 3:
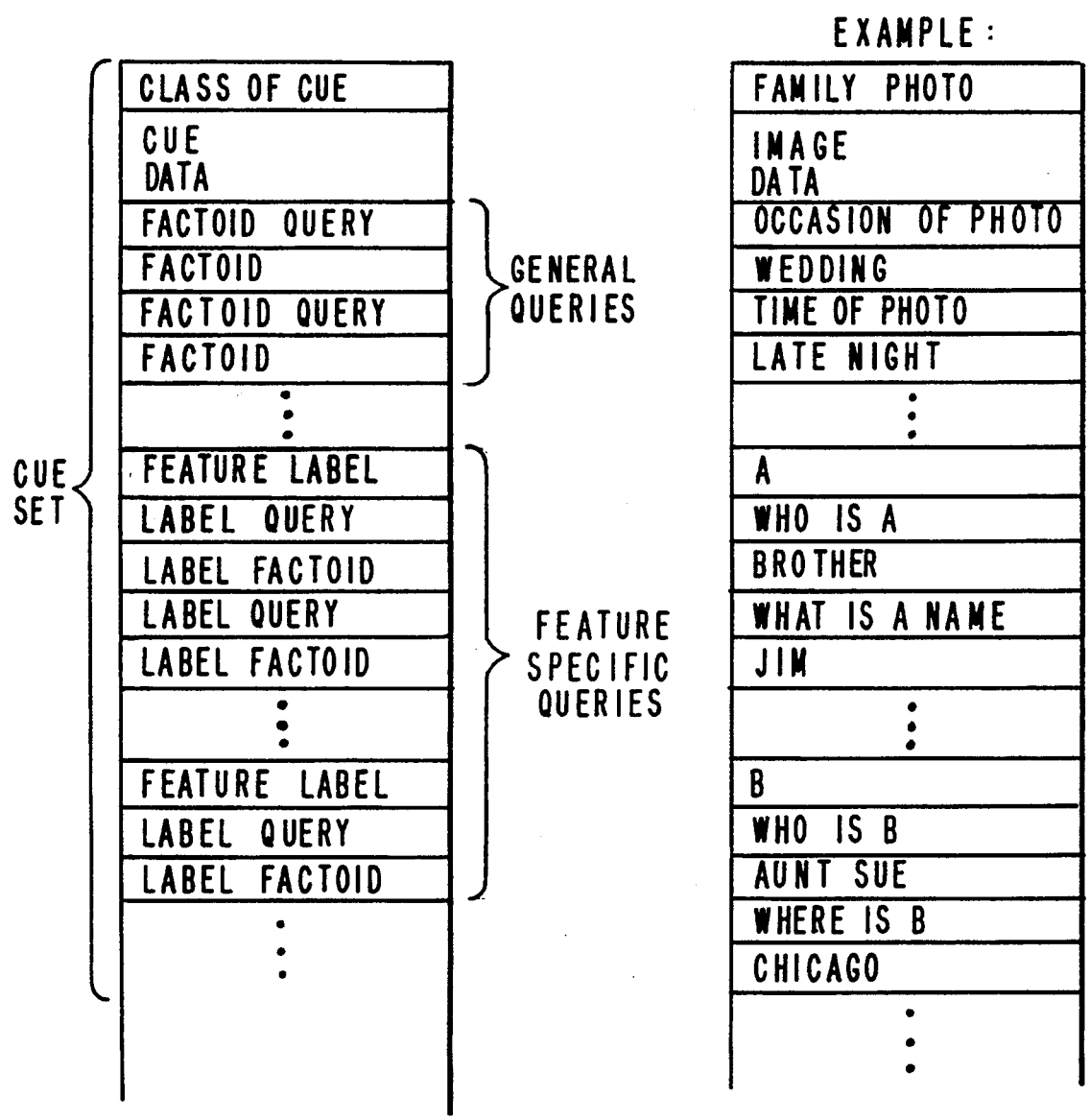
FIG. 3 is a diagram illustrating the arrangement of the peculiar information stored in the Data Base of FIG. 1.

In either mode, a data structure containing the total information may be created as in FIG. 3 and stored as part of a cue set for the individual who entered the information in the system.

Figure 4:
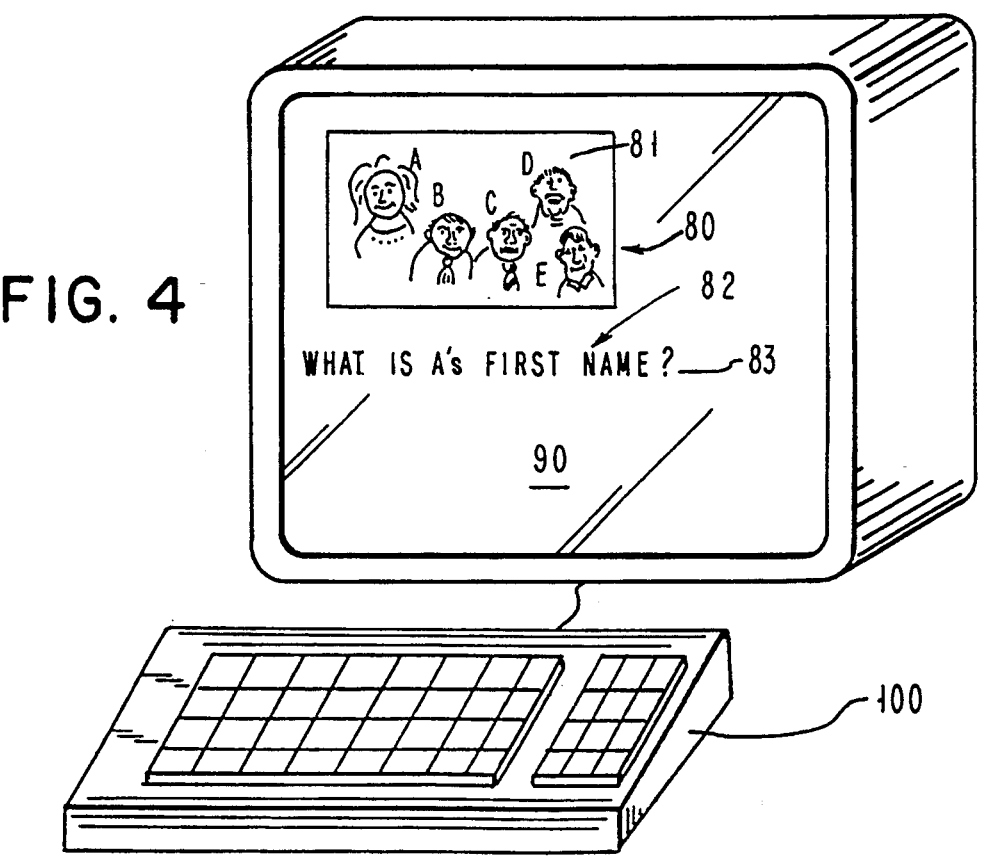
FIG. 4 illustrates a multimedia-type I/O device displaying a representation of a cue item in the form of a family picture along with a related query to prompt a user to respond with an appropriate input on a keyboard terminal.

After the data base has been initialized and an individual who is authorized wishes to gain access to the secured environment, the access control system is entered upon the individual identifying himself by inputting a name or some simple code. If the code is recognized, appropriate signals are generated to access the identified individual's cue set portion in the data base, and a first cue, determined by pre-set order or random selection, and a query based on an associated fact is presented to the individual for a reaction and a response. For example, if the cue set based on the family picture cue described above is currently being processed, then the stored family picture and a query like "what is A's first name?" might be requested as in the first mode described above. As shown by way of example in FIG. 4, the cue 80, in the form of a representation 81 of the family picture, on a monitor screen 90, and the query 82, in the form of text 83 on the same screen, are presented to the individual seeking access. The individual will then enter a response, e.g., in the form of a signal input by means of a keyboard 100, in accordance with the readily recallable information within his personal knowledge that the cue and query combination prompts, which information he has earlier supplied to the data base by virtue of its readily recognizable and recallable nature.

After the correctness of the response has been determined, the next cue and query pair is treated similarly, until all or some preset number of such pairs have been presented. The preset number may be varied in accordance with the level of security desired. If all responses are correct, then a signal is generated and sent to an access system which grants access to the secured environment; otherwise, access is denied.

Assuming that an attempt is made at correctly guessing the proper set of responses, it will be seen that, if the number of cue sets queried is i, the number of queries per cue set is j, and the number of possible responses per query is k, then the possibility of random guesses being correct is only 1 in $k^{**}j^{*}i$. If a family portrait cue set type is employed, only for family and close friends will the responses to queries be other than random. If in addition, a work project cue set type is employed, only for family and close friends who also are work project members will the correct responses be readily elicited. If further, a vacation cue set type is employed, only for family and close friends who are work project members who also were on a memorable vacation will the responses to both sets of queries be other than random. Thus, by choosing a small set of cue set types and fixing i, j, and k, any level of security against unauthorized access can be easily provided.

In current security systems based on selected word pairs, once the proper word pair has been discovered by someone attempting to penetrate a system, subsequent penetrations are trivial, until the word pair is changed. With the present invention, if the number of cue sets is I, of which i are queried, and the number of queries per cue set are J, of which j are to be queried, then the probability that a successful penetration will aid in answering a subsequent query is only $i*j$ in $I*J$. Consequently, by providing a sufficiently large I and J the present invention can easily be tailored to provide any level of security against subsequent penetrations in the unlikely event an intruder should inadvertently gain one access.

A particular embodiment of the system of the invention may be implemented on an IBM PS/2 computer in a simple BASIC program environment. The cues may be images stored in a file system accessible from a PS/2. The cue set data may be stored and organized as simple data for a BASIC program, and the control and access systems may be coded in the same BASIC program. Random selection of cues and queries may be enabled by a random number generator supplied with the BASIC system. An example of a simple program which may be used in implementing the invention using pictures of a dog and/or persons as the multimedia data is appended to this specification.

It will accordingly be seen that a system and method have been set forth that may be adapted to control access to and use of system storage facilities (disks, tape, cylinder, etc.) or the information contained on these media in personal computers, work stations, mainframe computers, and computers of all other types, as well as to control access to network facilities, and I/O facilities of personal computers, work stations, mainframe computers and computers of all other types. Additionally, the invention may be applied in controlling access to information sources, banking machines, secure rooms, buildings, or other areas, and for remote identification and access to credit card transactions, delayed payment transactions, pickup and delivery transactions, and many more environments as will be within the purview of those of skill in the art.

---

Y0992-142 - TPD
A. APPEL and M. A. O'CONNOR
APPENDIX

```
Program: IMAGPASS BAS
10 DEFINT I,J,K,L,M,N: DIM IMAG (100), ANS$ (40), IAN (100), IUSED (100), NR (30), L$ (6)
11 NAN= 0: IDT=VAL(RIGHT$(TIME$,1)): FOR II= 1 TO IDT:XXX=RND(1):NEXT II
12 L$(1)="A":L$(2)="B":L$(3)="C":L$(4)="D")"
20 FOR I = 1 TO 40:READ ANSS$
22 IF ANSS$="end" THEN 27
23 NAN=NAN + 1 :ANS$(NAN)=ANSS$:IUSED(NAN)=0
25 NEXT I
27 REM end of answers
30 SCREEN 2:CLS:KEY OFF:IFAKER=0
32 FOR I = 1 TO 3
33 J=RND (1)*11+1:IF IUSED(J)=1 THEN 33
34 IUSED(J)=1 :QN$=ANS$(J):FF$="sh1.pic"
35 IP=VAL(LEFT$(QN$,1):DEF SEG=&HB800:IF IP=2 THEN FF$="SH2.PIC"
36 BLOAD FF$,0:LOCATE 5,44:PRINT MID$(QN$,6,5)+"?";:GOSUB 200
39 LOCATE 5,34:PRINT "Describe ";:ABCD$=""
40 LOCATE 12,34:INPUT"INPUT"Enter A,B,C,D >",ABCD$:ABCD$=LEFT$(ABCD$,1)
42 IF ABCD$ ="a" OR ABCD$="b" OR ABCD$="c" OR ABCD$="d" THEN 43
    ELSE BEEP:LOCATE 12,39:PRINT"        ";:GOTO 40
43 IF ABCD$="a" THEN IG=1 ELSE IF ABCD$="b" THEN IG=2
    ELSE IF ABCD$="c" THEN IG=3 ELSE IG=4
45 IF IG=IC THEN 50 ELSE IFAKER=1
49 'K$=INKEY$:IF K$="" THEN 49
50 NEXT I
51 IF IFAKER=1 THEN 400
52 LOCATE 20,5:PRINT" YOU ARE OK ";:PLAY"o1l16 abdabdo4l64abd"
99 END
200 REM section to randomize answers
202 FOR IJ = 1 TO 4:NR(IJ)=0:LOCATE 5+IJ,38:PRINT L$(IJ);:NEXT IJ
204 IC=RND(1)*3+1:NR(IC)=1:LOCATE 5+IC,41:PRINT MID$(QN$,11,10);
206 FOR IRN=1 TO 3
208 IW=RND(1)*3+1:IF NR(IW)=1 THEN 208
209 NR(IW)=1: LOCATE 5+IW,41: PRINT MID$(QN$,11+10*IRN,10);
211 NEXT IRN
218 RETURN
400 REM reject imagepass fraud
402 PLAY "132adcl16abd":SCREEN 1:LINE(5,5)-(140,140),2,BF
403 LINE (15,15)-(130,130),1,BF
404 LINE (25,25)-(120,120),3,BF
```

-continued

Y0992-142 - TPD
A. APPEL and M. A. O'CONNOR
APPENDIX

```
405 LINE (35,35)-(110,110),0,BF
406 LINE (45,45)-(100,100),2,BF
407 LOCATE 10,10:PRINT"Goodbye Faker !";:PLAY"164o3aefo1aba"
408 LOCATE 22,24:END
997 REM format of data
998 REM 1-5 relevent image;6-10 cue noun; 11-20 correct; x1-x+10 wrongs
1000 DATA "12345678901234567890123456789012345678901234567890"
1002 DATA "1  name Madison   Chelsea   Salom    Jefferson   "
1004 DATA "1  home Yorktown  yard      Queens   Pittsburgh"
1005 DATA "1  breedpug       pig       pekinese hound       "
1007 DATA "1  food lickchops alpo      chinoire milkbone    "
1009 DATA "1  hobbychasecars chasecats sleep    chewfigmt"
1011 DATA "2  name Seth      Robert    Peter    Paul        "
1012 DATA "2  home Biming    TelYah    Jerus    Elat        "
1015 DATA "2  job what?      student   Midrach  intern      "
1017 DATA "2  majorPhil      Relig     Money    CS          "
1018 DATA "2  eyes grn       blue      brn      gray        "
1021 DATA "2  food vegs      falafal   subway   steak       "
1023 DATA "end"
```

What is claimed is:

1. A computer-utilizing security system for obtaining access to a secured environment, comprising:

storage means for storing data in cue sets comprising multimedia data and a multiplicity of structured information data having a relationship to said multimedia data that is peculiar to the knowledge of a person authorized to access the secured environment;

multimedia means for presenting representations of the multimedia data along with a portion of the multiplicity of structured information data of a cue set to an individual seeking access to the secured environment to stimulate identification reactions based on said individual's peculiar knowledge of the relationship of the multiplicity of structured information data to the multimedia data presented;

stimulating means for prompting said individual to produce an input in response to the presentation of said portion of the structured information data and the multimedia data of the cue set, which input is in keeping with the identification reaction of said individual stimulated thereby;

input means, responsive to the input, for producing an input signal indicative of the identification reaction of said individual stimulated by said presented information and said multimedia data;

control means for comparing the input signal with a signal preselected to be in keeping with the identification reaction to be stimulated in said at least one person by the portion of the cue set presented, and for producing an indicator signal in response to a proper correspondence between the input signal and the preselected signal; and access means, responsive to the indicator signal, for opening access to the secured environment;

wherein said multimedia means comprises means for producing a display and wherein said multimedia data representation comprises an image on said display and the presentation of said portion of the multiplicity of structured information data elicits a response from said individual regarding the contents of the image.

2. A system as in claim 1 further comprising means for randomizing the selection of the cue set to be presented, each time access to a secured environment is sought.

3. A system as in claim 1 further comprising means for controlling said access means, to respond to a plurality of said indicative signals before opening access to the secured environment.

4. A system as in claim 1 wherein said storage means comprises a structured data base having means for associating the multimedia data and the multiplicity of structured information data in said cue sets and means for organizing creation of and access to collections of cue sets stored for persons with authority to access the secured environment.

5. A system as in claim 4 further comprising means for producing an identification signal indicative of a person with authority to access the secured environment, and means responsive to said identification signal for accessing a cue set stored for said person in said data base.

6. A computer-utilizing security system for obtaining access to a secured environment, comprising:

storage means for storing data in cue sets comprising multimedia data and a multiplicity of structured information data having a relationship to said multimedia data that is peculiar to the knowledge of a person authorized to access the secured environment;

multimedia means for presenting representations of the multimedia data along with a portion of the multiplicity of structured information data of a cue set to an individual seeking access to the secured environment to stimulate identification reactions based on said individual's peculiar knowledge of the relationship of the multiplicity of structured information data to the multimedia data presented;

stimulating means for prompting said individual to produce an input in response to the presentation of said portion of the structured information data and the multimedia data of the cue set, which input is in keeping with the identification reaction of said individual stimulated thereby;

input means, responsive to the input, for producing an input signal indicative of the identification reaction of said individual stimulated by said presented information and said multimedia data;

control means for comparing the input signal with a signal preselected to be in keeping with the identification reaction to be stimulated in said at least one person by the portion of the cue set presented, and for producing an indicator signal in response to a proper correspondence between the input signal and the preselected signal; and access means, responsive to the indicator signal, for opening access to the secured environment;

wherein said multimedia means comprises means for producing a display and wherein said multimedia data representation comprises an image on said display and said presentation of said portion of the multiplicity of structured information data comprises text in the form of a question regarding the contents of said image.

7. A system as in claim 6 wherein said multiplicity of structured information data comprises a number of said text questions and further comprising means for selecting a series of said text questions to be presented in combination with the same image of a cue set.

8. A system as in claim 7 further comprising means for randomizing the selection of said text questions in said series to be presented in combination with the same image of a cue set, each time access to a secured environment is sought.

9. A system as in claim 7 further comprising means for randomizing the selection of the image of a cue set to be presented, each time access to a secured environment is sought.

* * * * *